United States Patent
Endo et al.

(10) Patent No.: US 9,786,180 B2
(45) Date of Patent: Oct. 10, 2017

(54) POSITION INFORMATION TRANSMISSION APPARATUS, POSITION INFORMATION TRANSMISSION SYSTEM, AND VEHICLE

(75) Inventors: Masato Endo, Nagoya (JP); Chihaya Todoroki, Nisshin (JP); Hiroaki Sekiyama, Koto-ku (JP); Takayuki Sumiya, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 58 days.

(21) Appl. No.: 14/406,019

(22) PCT Filed: Jun. 6, 2012

(86) PCT No.: PCT/JP2012/064551
§ 371 (c)(1),
(2), (4) Date: Jan. 21, 2015

(87) PCT Pub. No.: WO2013/183128
PCT Pub. Date: Dec. 12, 2013

(65) Prior Publication Data
US 2015/0154870 A1    Jun. 4, 2015

(51) Int. Cl.
*G06F 19/00* (2011.01)
*G08G 1/00* (2006.01)
(Continued)

(52) U.S. Cl.
CPC ............ *G08G 1/20* (2013.01); *G06Q 50/01* (2013.01); *G08G 1/0112* (2013.01);
(Continued)

(58) Field of Classification Search
USPC ........................... 701/400, 517, 408
See application file for complete search history.

(56) References Cited

U.S. PATENT DOCUMENTS 5,948,040 A * 9/1999 DeLorme ............... G01C 21/36
340/990
2002/0077910 A1* 6/2002 Shioda .................. G01C 21/26
705/14.69
(Continued)

FOREIGN PATENT DOCUMENTS

EP    2 787 477 A1    10/2014
EP    2 848 894 A1     3/2015
(Continued)

OTHER PUBLICATIONS

International Search Report issued Sep. 4, 2012 in PCT/JP2012/064551 filed Jun. 6, 2012.
(Continued)

*Primary Examiner* — Ronnie Mancho
(74) *Attorney, Agent, or Firm* — Oblon, McClelland, Maier Neustadt, L.L.P.

(57) ABSTRACT

A navigation device serving as a position information transmission apparatus for transmitting position information about a vehicle to a position information service center includes a terminal ECU that is authorized to log in to the position information service center via networks. The terminal ECU is configured to, in a logged-in state to the position information service center, transmit the position information about the vehicle to the position information service center on condition that a predetermined operation has been performed.

24 Claims, 6 Drawing Sheets

(51) Int. Cl.
*H04W 4/04* (2009.01)
*G06Q 50/00* (2012.01)
*G08G 1/01* (2006.01)
*H04L 29/08* (2006.01)
*G01C 21/26* (2006.01)

(52) U.S. Cl.
CPC ........... *G08G 1/0129* (2013.01); *H04L 67/12* (2013.01); *H04W 4/046* (2013.01); *G01C 21/26* (2013.01)

(56) References Cited

U.S. PATENT DOCUMENTS

| | | | |
|---|---|---|---|
| 2003/0149526 A1* | 8/2003 | Zhou | G01S 5/0027 701/408 |
| 2003/0201914 A1 | 10/2003 | Fujiwara et al. | |
| 2003/0220835 A1* | 11/2003 | Barnes, Jr. | G06Q 10/1053 705/14.36 |
| 2004/0012506 A1 | 1/2004 | Fujiwara et al. | |
| 2005/0075119 A1* | 4/2005 | Sheha | G01C 21/26 455/456.6 |
| 2005/0273218 A1* | 12/2005 | Breed | B60C 11/24 701/2 |
| 2006/0158330 A1* | 7/2006 | Gueziec | G01C 21/3492 340/539.13 |
| 2007/0138347 A1* | 6/2007 | Ehlers | G01C 21/3461 246/1 R |
| 2007/0192872 A1* | 8/2007 | Rhoads | G06F 3/017 726/26 |
| 2008/0014917 A1* | 1/2008 | Rhoads | G06F 3/017 455/422.1 |
| 2011/0054777 A1* | 3/2011 | Rossio | G01C 21/3644 701/533 |
| 2011/0112717 A1 | 5/2011 | Resner | |
| 2011/0144899 A1* | 6/2011 | Soelberg | G01C 21/3461 701/532 |
| 2011/0184640 A1* | 7/2011 | Coleman | G01C 21/3492 701/533 |
| 2012/0253548 A1* | 10/2012 | Davidson | G06Q 10/08 701/1 |
| 2012/0290950 A1* | 11/2012 | Rapaport | H04L 51/32 715/753 |
| 2013/0059607 A1* | 3/2013 | Herz | H04L 67/20 455/456.3 |
| 2014/0038640 A1* | 2/2014 | Wesselius | G08G 1/202 455/456.1 |
| 2014/0337546 A1 | 11/2014 | Kitahama et al. | |
| 2015/0126225 A1 | 5/2015 | Endo et al. | |
| 2015/0202770 A1* | 7/2015 | Patron | G05D 1/024 700/245 |

FOREIGN PATENT DOCUMENTS

| | | |
|---|---|---|
| JP | 10-089976 A | 4/1998 |
| JP | 2000-268093 A | 9/2000 |
| JP | 2003-330933 A | 11/2003 |
| JP | 2004-062688 A | 2/2004 |
| JP | 2007-232610 A | 9/2007 |
| JP | 2007-304009 A | 11/2007 |
| JP | 2011-160934 A | 8/2011 |
| JP | 2011-247831 A | 12/2011 |
| JP | 2012-008969 A | 1/2012 |
| JP | 2012-078305 A | 4/2012 |

OTHER PUBLICATIONS

Extended European Search Report issued Jun. 8, 2015 in Patent Application No. 12878409.7.

* cited by examiner

POSITION INFORMATION TRANSMISSION APPARATUS, POSITION INFORMATION TRANSMISSION SYSTEM, AND VEHICLE

TECHNICAL FIELD

The present invention relates to a technology for transmitting position information about a vehicle to a position information service center.

BACKGROUND ART

In Patent Literature 1, there is disclosed a technology for providing added value based on the movements of a user by registering in an external position information service center movement-related information acquired by a user's mobile terminal including a GPS receiver. In the position information service center, after a program has been started based on a first key operation by the user, position information about the user is acquired from the GPS receiver based on the pressing of a button for registering the position of the mobile terminal by a further second key operation by the user. As a result of this operation, special benefit position information stored in a server is acquired. Further, if the acquired position information about the mobile terminal is included in the pre-set special benefit position information, the user is given a special benefit.

CITATION LIST

Patent Literature

[PTL 1] JP 2011-160934 A

SUMMARY OF INVENTION

Technical Problem

Incidentally, there is a need to provide added value to users by transmitting position information about, for example, a vehicle, which may even be moving, to an external position information service center and the like. However, it is difficult for the user to perform the key operations a plurality of times while driving as described in Patent Literature 1. Therefore, when performing such key operations, the user needs to take a measure such as stopping the vehicle.

Accordingly, the present invention has been made in view of the above-mentioned points, and it is an object thereof to provide an effective technology for easily transmitting position information about a vehicle to a position information service center.

In order to achieve the above-mentioned object, a position information transmission apparatus according to one embodiment of the present invention, which is an apparatus for transmitting position information about a vehicle to a position information service center, includes a control unit that is authorized to log in to a predetermined position information service center via a network. The position information transmission apparatus may be, for example, a vehicle-mounted device such as a navigation device, or an information terminal (a mobile phone (including a smartphone), a personal computer (PC), etc.) that can be used not only in the vehicle but also outside of the vehicle, in the home, and the like. The "position information" referred to here may include information about the current position of the vehicle or the user. Alternatively, for a virtual location or position that the vehicle or the user can check in to with one or a plurality of social networking services (SNSs) and the like, the "position information" may include information such as coordinates defined by longitude and latitude, a place name, a facility name, and a building name. On a social networking service or a position information service, the user can share information relating to a predetermined location with other users by, for example, checking in to the location by submitting (also referred to as "registering") information relating to the location.

The control unit transmits, in a logged-in state to the position information service center, the position information about the vehicle to the position information service center on condition that the predetermined operation has been performed. In other words, this control unit includes transmission means for transmitting the position information about the vehicle to the position information service center on condition that the predetermined operation has been performed. It is preferred that the login state be formed by the control unit performing account authentication between an account of the position information transmission apparatus and an account of the position information service center. In this case, typically, the accounts are defined by a login ID, or a combination of a login ID and a password. Note that, the predetermined operation is not limited, as long as the predetermined operation triggers the transmission of the position information about the vehicle to the position information service center. The control unit may transmit the position information about the vehicle immediately after the predetermined operation has been performed, or may perform different processing after the predetermined operation is performed and then execute processing of transmitting the position information about the vehicle.

Typically, as a precondition that the position information about the vehicle is to be transmitted to the position information service center, it is preferred that the vehicle be in a drive state (is in a traveling or pre-traveling state) or in a drive preparation state. Alternatively, it is preferred that the navigation device and the like serving as the position information transmission apparatus be in an operational state when the vehicle starts to be driven. In this case, the "navigation device", which fulfills a function of performing route guidance of the vehicle (performs a navigation function), is installed in a specific vehicle as a dedicated device. Alternatively, the navigation device may be a vehicle-mounted device that fulfills a navigation function by being installed as a shared device between a specific vehicle and another vehicle, or a mobile device (including a smartphone) that includes a GPS receiver and fulfills a navigation function using navigation application software (also referred to as a "navigation application") or based on a communications contract. Therefore, when the ignition of the vehicle is in an ON state, or when the parking brake is in an OFF state, or when a traveling speed exceeding a predetermined threshold is detected, it is determined that the vehicle is actually in a drive state. On the other hand, when the start switch of the navigation device is in an ON state, or if the navigation device is a mobile device such as a smartphone for example, when establishment of pairing between the mobile device and the vehicle has been detected, the navigation device is determined as being in an operational state.

Typical examples of the "predetermined operation" referred to here include a touch operation (e.g., a tap operation, a flick operation, a swipe operation, a pinch operation, a scroll operation, a drag operation, etc.) in which the display screen of the navigation device serving as a vehicle-mounted device or a mobile device or the display screen on an information terminal managed by the user is touched. Further examples include an operation of activating switches provided on the steering wheel of the vehicle, an operation for speaking into a voice input unit, and the like. To simplify the user operation for transmitting the position information about the vehicle, it is preferred that the predetermined operation be a single operation.

According to the above-mentioned position information transmission apparatus, a state of being logged in to the position information service center is formed in advance before the predetermined operation, for example. Therefore, the user can easily transmit the position information about the vehicle to the position information service center just by performing the predetermined operation. In particular, the position information about the vehicle can be transmitted to an external position information service center without hindrance even while driving or riding in the vehicle. The position information about the vehicle transmitted to the position information service center is utilized with one or a plurality of social networking services (SNSs) as position information (so-called check-in information) about a place, a store, a facility, and the like that the user has passed through or arrived at, or is utilized to give a special benefit to the user on an online game and the like. Thus, it is preferred that the position information service center be a facility fulfilling a function of managing and utilizing the position information about the vehicle.

In the position information transmission apparatus according to one embodiment of the present invention, it is preferred that the control unit selectively acquire and output via the network a nearby check-in point that is near the vehicle and is available to be checked in to from among check-in points that are available to be checked in to and stored in the position information service center. In other words, the control unit includes acquisition means and output means. The acquisition means fulfills a function of selectively acquiring the nearby check-in point that is near the vehicle and is available to be checked in to from among the check-in points that are available to be checked in to and stored in the position information service center. The output means fulfills a function of outputting the nearby check-in point acquired by the acquisition means. In this case, output means configured so that the nearby check-in point is output by a screen display or by a spoken output can be used. Consequently, the user can check in by confirming a location that is near the vehicle and is available to be checked in to, and then quickly transmitting the position information about the vehicle to the position information service center without missing the location.

In the position information transmission apparatus according to one embodiment of the present invention, it is preferred that the control unit derive the position information from movement information relating to movement of the vehicle and transmit the derived position information to the position information service center. Examples of the "movement information" referred to here include position information about the vehicle (a movement location that the vehicle has moved to or a movement history), speed information, time information, and the like. In this case, the position information about the vehicle can be derived based on processing to extract information from among the movement information about the vehicle, or based on computation processing applying a predetermined formula and the like on the movement information about the vehicle. Consequently, information communication can be performed in which consideration is given to privacy, because not all of the movement information about the vehicle is transmitted as is to the external position information service center.

A position information transmission apparatus according to one embodiment of the present invention, which is an apparatus for transmitting position information about a vehicle to a position information service center, includes a control unit connected via a network to an information processing center for storing the position information about the vehicle in cooperation with the position information service center. The control unit fulfills a function of outputting a control signal to the information processing center so that the position information about the vehicle is transmitted from the information processing center to the position information service center on condition that a predetermined operation like that described above has been performed. This enables transmission of the position information about the vehicle to the position information service center to be carried out only based on the user's intention. Hence, the position information about the vehicle can be prevented from always being transmitted to the position information service center. In this case, the position information about the vehicle can be transmitted from the information processing center to the position information service center by a simple operation without the position information transmission apparatus directly accessing the position information service center.

In the position information transmission apparatus according to one embodiment of the present invention, it is preferred that the control unit acquire and output via the network from the information processing service center a nearby check-in point that is near the vehicle and is available to be checked in to. In this case, the nearby check-in point may be stored in the information processing center or stored in the position information service center. Consequently, the user can check in by quickly transmitting the position information about the vehicle to the position information service center without missing the nearby check-in point.

In the position information transmission apparatus according to one embodiment of the present invention, it is preferred that the control unit output a control signal to the information processing center so that the information processing center derives the position information from movement information relating to movement of the vehicle and transmit the derived position information to the position information service center. Consequently, information communication can be performed in which consideration is given to privacy, because not all of the position information about the vehicle is transmitted as is to the external position information service center.

In the position information transmission apparatus according to one embodiment of the present invention, it is preferred that the predetermined operation be a screen operation on a first screen for checking in to a location corresponding to the position information about the vehicle, and that the control unit display the first screen on the same display area as a second screen that fulfills a function other than check in. In other words, this control unit includes display means for displaying the first screen on the same display area as the second screen that fulfills the function other than check in. In this case, typical examples of the "screen operation" include, for the screen of a navigation device, or an information terminal (a mobile phone (including a smartphone), a personal computer (PC), etc.), a touch operation (e.g., a tap operation, a flick operation, a swipe operation, a pinch operation, a scroll operation, a drag operation, etc.) on the screen, a selection operation of a link displayed on the screen, and the like. Further, as the second screen, in the navigation device, it is preferred to employ a screen that displays map information for route guidance, or a screen that displays information from a source (audio, television, radio, VTR, etc.) other than route guidance. Consequently, when the second screen that fulfills the function other than check in is displayed during driving, the first screen for checking in is automatically displayed. Therefore, the first screen for checking in can be easily displayed without requiring a dedicated operation for displaying the first screen during driving.

In the position information transmission apparatus according to one embodiment of the present invention, it is preferred that the control unit display the first screen on the same display area as the second screen by superimposing the first screen on the second screen for display. In other words, this control unit includes display means for superimposing the first screen on the second screen for display. In this case, the first screen may be displayed superimposed on the second screen in a state in which the second screen is already displayed, or the first screen and the second screen may be simultaneously displayed so that the first screen is superimposed on the second screen. Consequently, the first screen for checking in can be easily displayed during driving without changing the size or the display content of the second screen.

In the position information transmission apparatus according to one embodiment of the present invention, it is preferred that the control unit display the first screen on the same display area as the second screen by splitting one screen having a predetermined size into at least the first screen and the second screen for display. In other words, this control unit includes display means for splitting the one screen having the predetermined size into at least the first screen and the second screen. In this case, in a state in which the second screen matching one screen having a predetermined size is already displayed, the one screen may be split into the first screen and the second screen. Alternatively, the first screen and the second screen may be displayed simultaneously in a state in which one screen having a predetermined size is split into the first screen and the second screen. Further, one screen having a predetermined size may be further split into a third screen different from the first split screen and the second split screen. Consequently, the first screen for checking in can be easily displayed alongside the second screen during driving. Therefore, the user can identify the first screen for checking in about as easily as the second screen.

A position information transmission apparatus according to one embodiment of the present invention, which is an apparatus for transmitting position information about a vehicle to a position information service center, includes a control unit connected via a network to an information processing center for storing a movement history of the vehicle in cooperation with the position information service center. In this case, typical examples of the position information transmission apparatus that can be used include a navigation device mounted in the vehicle and an information terminal (a mobile phone (including a smartphone), a personal computer (PC), etc.). Typical examples of the "movement history" referred to here include past movement routes (movement locations) of the vehicle. When the movement history stored in the information processing center has been retrieved, the control unit acquires and outputs via the network a check-in point that is available to be checked in to is included in the movement history and, on condition that an operation for designating the output check-in point has been performed, outputs a control signal to the information processing center so that position information corresponding to the designated check-in point is transmitted from the information processing center to the position information service center. In this case, when a plurality of check-in points are output, all or a part of the plurality of check-in points may be designated at the same time, or each check-in point may be designated.

Consequently, particularly after the vehicle has stopped being driven, the user can refer to the movement history of the vehicle by accessing the information processing center. Further, a vehicle occupant other than the driver can refer to the movement history even while the vehicle is being driven. Then, the user can designate a check-in point included in the movement history to check in to a check-in point. Therefore, the user can transmit the position information about the vehicle to the position information service center only based on the user's intention in view of his/her past driving history. Hence, the position information about the vehicle can be prevented from always being transmitted to the position information service center. In this case, the user transmits only the information that is required for checking in to his/her desired check-in point. Consequently, information communication can be performed in which consideration is given to privacy. Further, the position information about the vehicle can be transmitted to the position information service center from the information processing center based on a simple operation, without the position information transmission apparatus directly accessing the position information service center.

In the position information transmission apparatus according to one embodiment of the present invention, the control unit fulfills a function of outputting the acquired check-in point along with map information to a display unit. In other words, this control unit is configured as output means for outputting to the display unit the acquired check-in point along with the map information. Consequently, the user can refer to the check-in point included in the movement history on a map.

In the position information transmission apparatus according to one embodiment of the present invention, the control unit fulfills a function of outputting information urging an operation for designating the output check-in point. In other words, this control unit is configured as output means for outputting the information urging the operation for designating the output check-in point. In this case, it is preferred that the information be output by a display or a spoken output. Consequently, a smoother check-in operation by the user is realized.

A position information transmission system according to one embodiment of the present invention, which is a system for transmitting position information about a vehicle to a position information service center, includes a movement information detection apparatus and a position information service center.

The movement information detection apparatus is an apparatus for detecting movement information about a vehicle. As the movement information detection apparatus, typically, a navigation device or an information terminal (a mobile phone (including a smartphone), a personal computer (PC), etc.) always or temporarily installed in the vehicle is used. The movement information detection apparatus is connected to the position information service center in a manner that allows the movement information detection apparatus to log in to the position information service center. In a state in which the movement information detection apparatus is logged in to the position information service center, the control unit derives position information corresponding to the movement information from the movement information detected by the movement information detection apparatus on condition that a predetermined operation has been performed, and transmits the derived position information to the position information service center. In other words, this control unit fulfills substantially the same function as the control unit of the above-mentioned position information transmission apparatus.

According to the above-mentioned position information transmission system, the user can easily transmit the position information about the vehicle to the position information service center just by performing the predetermined operation. In particular, the position information about the vehicle can be transmitted to an external position information service center without hindrance even while driving or riding in the vehicle. Further, information communication can be performed in which consideration is given to privacy, because not all of the position information about the vehicle is transmitted as is to the external position information service center.

In the position information transmission system according to one embodiment of the present invention, it is preferred that the control unit selectively acquire and output a nearby check-in point that is near the vehicle and is available to be checked in to from among check-in points that are available to be checked in to and are stored in the position information service center. Consequently, the user can check in by quickly transmitting the position information about the vehicle to the position information service center without missing the nearby check-in point.

In the position information transmission system according to one embodiment of the present invention, it is preferred that the control unit be provided in the movement information detection apparatus, and derive, with the movement information detection apparatus, position information corresponding to the movement information from the movement information about the vehicle detected by the movement information detection apparatus and transmit the derived position information to the position information service center. Examples of the "movement information about the vehicle" referred to here include position information about the vehicle, speed information, time information, and the like. Consequently, it is possible to build a system configured so that the processing for selecting only the position information from among movement information about the vehicle is performed by the movement information detection apparatus.

The position information transmission system according to one embodiment of the present invention, which is a system for transmitting position information about a vehicle to a position information service center, includes an information processing center and a control unit. The information processing center fulfills a function of storing the position information about the vehicle in cooperation with the position information service center. The control unit is connected to the information processing center via a network. This control unit outputs a control signal to the information processing center so that the information processing center transmits the position information to the position information service center on condition that the predetermined operation like that described above has been performed. This enables transmission of the position information about the vehicle to the position information service center to be carried out only based on the user's intention. Hence, the position information about the vehicle can be prevented from always being transmitted to the position information service center. In this case, the position information about the vehicle can be transmitted from the information processing center to the position information service center by a simple operation without the position information transmission apparatus directly accessing the position information service center.

In the position information transmission system according to one embodiment of the present invention, it is preferred that the control unit acquire and output via the network from the information processing center a nearby check-in point that is near the vehicle and is available to be checked in to. Consequently, the user can check in by quickly transmitting the position information about the vehicle to the position information service center without missing the nearby check-in point.

In the position information transmission system according to one embodiment of the present invention, it is preferred that the control unit output a control signal to the information processing center so that the information processing center derives the position information from movement information relating to movement of the vehicle and transmit the derived position information to the position information service center. Consequently, information communication can be performed in which consideration is given to privacy, because not all of the position information about the vehicle is transmitted as is to the external position information service center.

In the position information transmission system according to one embodiment of the present invention, it is preferred that the predetermined operation be a screen operation on a first screen for checking in to a location corresponding to the position information about the vehicle, and that the control unit display the first screen on the same display area as a second screen that fulfills a function other than check in. Consequently, when the second screen that fulfills the function other than check in is displayed, the first screen for checking in is automatically displayed. Therefore, the first screen for checking in can be easily displayed without requiring a dedicated operation for displaying the first screen during driving.

In the position information transmission system according to one embodiment of the present invention, it is preferred that the control unit display the first screen on the same display area as the second screen by superimposing the first screen on the second screen for display. Consequently, the first screen for checking in can be easily displayed during driving without changing the size or the display content of the second screen.

In the position information transmission system according to one embodiment of the present invention, it is preferred that the control unit display the first screen on the same display area as the second screen by splitting one screen having a predetermined size into at least the first screen and the second screen for display. Consequently, the first screen for checking in can be easily displayed alongside the second screen during driving. Therefore, the user can identify the first screen for checking in about as easily as the second screen.

A position information transmission system according to one embodiment of the present invention, which is a system for transmitting position information about a vehicle to a position information service center, includes an information processing center and a control unit. The information processing center fulfills a function of storing a movement history of the vehicle in cooperation with the position information service center. The control unit is connected via a network to the information processing center. When the movement history stored in the information processing center has been retrieved, the control unit acquires and outputs via the network a check-in point that is included in the movement history and, on condition that an operation for designating the output check-in point has been performed, outputs a control signal to the information processing center so that position information corresponding to the designated check-in point is transmitted from the information processing center to the position information service center.

Therefore, the user can transmit the position information about the vehicle to the position information service center only based on the user's intention in view of his/her past driving history. Hence, the position information about the vehicle can be prevented from always being transmitted to the position information service center. In this case, the user transmits only the information that is required for checking in to his/her desired check-in point. Consequently, information communication can be performed in which consideration is given to privacy. Further, the position information about the vehicle can be transmitted to the position information service center from the information processing center based on a simple operation, without the position information transmission apparatus directly accessing the position information service center.

In the position information transmission system according to according to one embodiment of the present invention, the control unit fulfills a function of outputting the acquired check-in point along with map information to a display unit. Consequently, the user can refer to the check-in point included in the movement history on a map.

In the position information transmission system according to one embodiment of the present invention, the control unit fulfills a function of outputting information urging an operation for designating the output check-in point. In this case, it is preferred that the information be output by a display or a spoken output. Consequently, a smoother check-in operation by the user is realized.

The vehicle according to one embodiment of the present invention vehicle includes a steering wheel for vehicle steering, an instrument panel provided in a front portion of the vehicle, a hardware button, and a control unit. The "instrument panel" referred to here is configured from all or a part of the mounted internal parts, such as the steering wheel, a dashboard, gauges, a navigation system monitor, an audio system, a glove compartment, a passenger seat airbag, and the like. The hardware button, which can be operated by pressing, is provided on at least one of the steering wheel or the instrument panel. Examples of the "hardware button" referred to here include various operating buttons that act as physical or mechanical component elements. The control unit fulfills a function of, when the hardware button is pressed, transmitting to a position information service center position information corresponding to a location that the vehicle is traveling through when the hardware button is pressed in order to check in to the location. In this case, the hardware button may be a check-in-dedicated button that fulfills only a check-in function, or may be a button having a check-in function and a different function assigned thereto. Further, the above-mentioned check-in function may also be assigned to a hardware button configured so that a predetermined one of a plurality of functions can be assigned to the hardware button. Consequently, the vehicle occupant can check in by pressing the hardware button, which is a single operation, to simply transmit the position information about the vehicle to the position information service center.

In the vehicle according to one embodiment of the present invention, it is preferred that the control unit output a nearby check-in point that is near the vehicle and is available to be checked in to along with map information to a display unit. In other words, this control unit is configured as output means for outputting the nearby check-in point that is near the vehicle and is available to be checked in to along with the map information to the display unit. In this case, the nearby check-in point may be stored in the position information service center or stored in the information processing center. Consequently, the vehicle occupant can check in by quickly transmitting the position information about the vehicle to the position information service center without missing the nearby check-in point.

DESCRIPTION OF EMBODIMENTS

Figure 1:
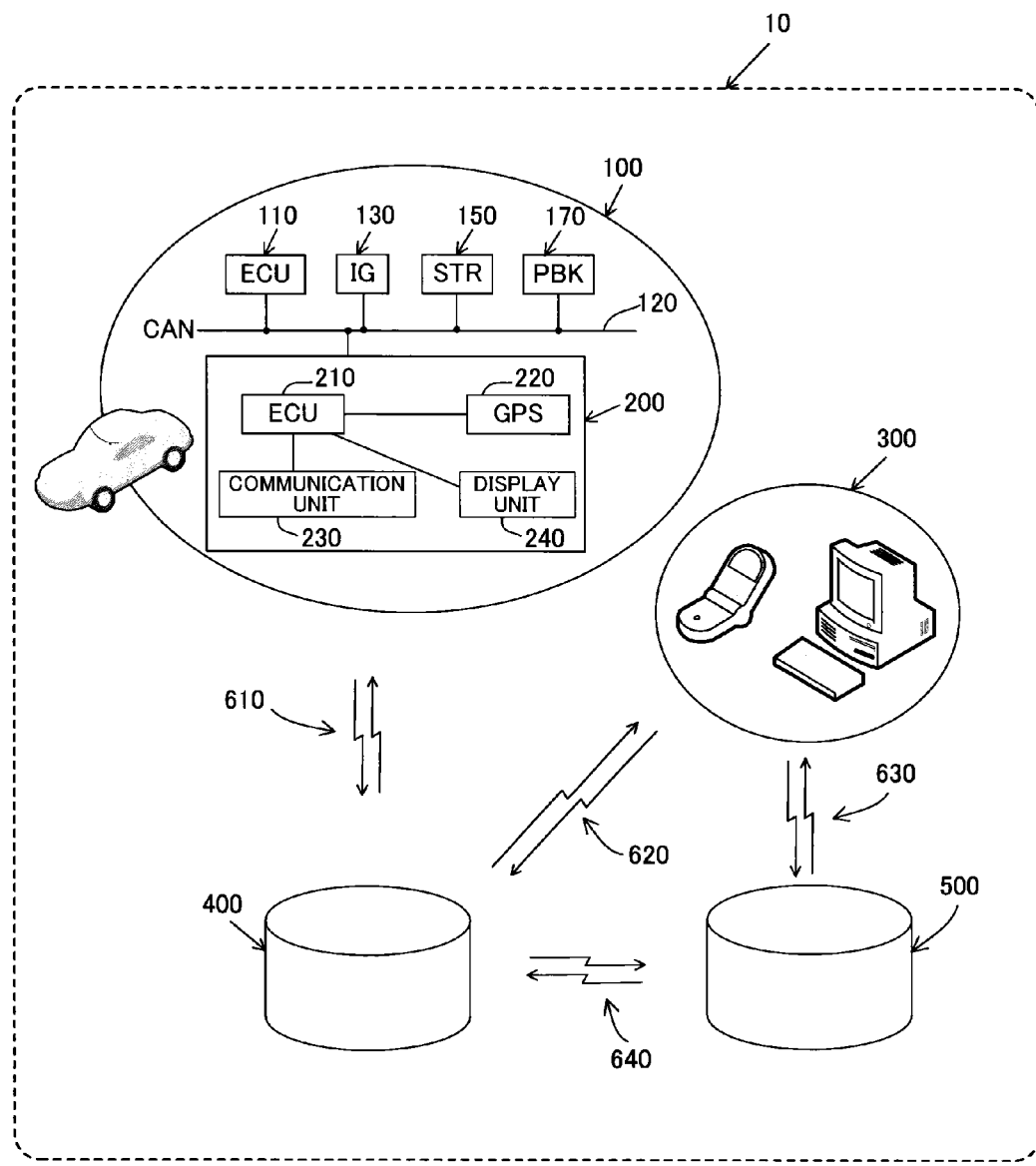
FIG. 1 is a schematic diagram of a position information transmission system 10 according to the present invention.

A position information transmission apparatus and a position information transmission system according to an embodiment of the present invention are described below with reference to the drawings. FIG. 1 illustrates a schematic diagram of a position information transmission system 10 according to the present invention.

The position information transmission system 10 illustrated in FIG. 1 includes, as component elements, a plurality of vehicles 100, a plurality of information terminals 300, an information processing center 400, a position information service center (a facility managing a so-called "Geomedia" that provides position information) 500, and networks 610, 620, 630, and 640. In FIG. 1, for convenience, only one vehicle 100 and one information terminal 300, respectively, are illustrated. In the position information transmission system 10, extra component elements in addition to the above-mentioned component elements may optionally be added. The position information transmission system 10 is a system for transmitting position information about each vehicle 100 to the external position information service center 500 in order to give added-value and special benefits to the user. The position information transmission system 10 corresponds to the "position information transmission system" of the present invention. The "position information" referred to here may include information about the current location or position of the vehicle 100 or the user. Alternatively, for a virtual location or position that the vehicle or the user can check in to with one or a plurality of social networking services (SNSs) and the like, the "position information" may include information such as coordinates defined by longitude and latitude, a place name, a facility name, a building name, and the like. The user can share information relating to a predetermined location with other users by, for example, checking in to the location by submitting (also referred to as "registering") information relating to the location on a social networking service or a position information service.

One or a plurality of electronic control devices 110 (hereinafter also referred to as "vehicle ECU 110") for controlling the state of the vehicle are provided in the vehicle 100. Each vehicle ECU 110 is connected to a controller area network (CAN) communication line 120 of a CAN communication system. The vehicle ECUs 110 can exchange various signals with each other via the CAN communication line 120. Further, each vehicle ECU 110 includes a microcomputer configured from a CPU, a ROM, a RAM, and the like, as a main component part, as well as a memory (storage medium), an input/output interface, and drive circuits for driving various actuators by inputting a sensor signal. In the vehicle 100, each vehicle ECU 110 is connected to at least an ignition device (also referred to as "IC") 130, a steering switch (also referred to as "STR") 150, a parking brake (also referred to as "PBK") 170, and a navigation device 200, respectively. For example, ON/OFF information about each of the ignition device 130, the steering switch 150, and the parking brake 170 is output to the navigation device 200 via the CAN communication line 120.

As the above-mentioned vehicle 100, an electric vehicle (EV) for driving a drive motor with battery power, a hybrid vehicle (HV) including a drive motor and an internal combustion engine, and a plug-in hybrid vehicle (PHV) including a drive motor and an internal combustion engine, and a battery that can be charged by a charger, can be employed. Alternatively, a conventional vehicle that does not include a drive motor and runs only on an internal combustion engine can also be used. The drive mode of the vehicle is not limited.

The navigation device 200, which is mounted on each vehicle 100, includes at least a navigation function for the vehicle (generally, a function for performing route guidance of the vehicle 100). The navigation device 200 may be installed as a dedicated device in each vehicle 100. Alternatively, the navigation device 200 may be a device that fulfills a navigation function by being installed as a shared device between the vehicle and another vehicle, or a device such as a mobile device (typically, a mobile phone) that includes a GPS receiver and fulfills a navigation function using navigation application software (also referred to as a "navigation application") or based on a communications contract.

In this case, a mode can be employed that performs CAN information communication to the navigation device 200 by connecting the navigation device 200 to the CAN communication line 120 by a wired connection or a wireless connection (e.g., near field communication using Bluetooth (trademark)). As another mode, a mode can be employed that transmits CAN information to the navigation device 200 by communication means from a place that aggregates information from each ECU in the vehicle 100. The navigation device 200 is temporarily or continuously connected to the information processing center 400 via a predetermined network (e.g., an Internet network or a secure network such as a dedicated network) 610, which enables information communication to and from the information processing center 400.

The navigation device 200 includes an electronic control device 210 (hereinafter also referred to as a "terminal ECU 210"), a GPS unit 220, a communication unit 230, and a display unit 240.

The terminal ECU 210 includes a microcomputer configured from a CPU, a ROM, a RAM, and the like, as a main component part, as well as a memory (storage medium), an input/output interface, and drive circuits for driving various actuators by inputting a sensor signal. The terminal ECU 210 includes a memory that stores information (e.g., name of the contracted party, ID information specifying the user, account information that allows the user to utilize the position information service center, and the like) relating to the user (the contracted party or the person using the device) of the navigation device 200.

The GPS unit 220 fulfils a function of measuring movement information relating to the current movement of the navigation device 200 (or, the vehicle 100 in which the navigation device 200 is mounted) based on radio waves from GPS satellites. Examples of the "movement information" referred to here include position information (a movement location that the vehicle 100 has moved to or a movement history) about the vehicle 100 or the navigation device 200, speed information, time information, and the like.

The communication unit 230 fulfills a function of receiving information transmitted from the information processing center 400 via the network 610, or, transmitting information from the terminal ECU 210, which is typically movement information (position or time etc. during movement of the vehicle 100) relating to the movement of the vehicle 100 detected by the GPS unit 220, to the information processing center 400 via the network 610.

The display unit 240 fulfills a function of displaying output information from the terminal ECU 210 on a display screen. In addition to the above-mentioned navigation function, the navigation device 200 referred to here is a device that fulfills a function of detecting movement information about the vehicle 100 with the GPS unit 220 in order for position information about the vehicle 100 to be transmitted to the position information service center 500. Hence, the navigation device 200 corresponds to the "position information transmission apparatus" and the "movement information detection apparatus" of the present invention.

The information terminal 300 is temporarily or continuously connected to the information processing center 400 via a predetermined network (e.g., an Internet network or a secure network such as a dedicated network) 620, which enables information communication to and from the information processing center 400. Further, the information terminal 300 is temporarily or continuously connected to the above-mentioned position information service center 500 via a network 630 similar to the network 620, which enables information communication to and from the position information service center 500. Typical examples of the information terminal 300 that can be used include a mobile phone (including a smartphone) and a personal computer (PC).

The information processing center 400, which includes a function of performing predetermined information processing, is connected to the navigation device 200 and the position information service center 500 via the networks 610 and 640, respectively. The information processing center 400 includes a server that stores movement information about the vehicle 100 received from the terminal ECU 210 of the navigation device 200 and position information corresponding to the movement information. The information processing center 400 fulfills a function of deriving the position information corresponding to the movement information from the movement information about the vehicle 100 transmitted from the navigation device 200, and transmitting the derived position information to the position information service center 500. Further, the information processing center 400 fulfills a function of relaying information stored in the position information service center 500 for transmission to the navigation device 200. The information processing center 400 referred to here corresponds to the "information processing center" of the present invention.

The position information service center 500, which has a function of managing a predetermined position information service, is connected to the information processing center 400 via the network 640. Consequently, the navigation device 200 is connected to the position information service center 500 in a manner that allows login via the networks 610 and 640 and the information processing center 400. The position information service center 500 includes a server that stores check-in information relating to locations (also referred to as "check-in points") available to be checked in with one or a plurality of social networking services (SNSs), and the position information about the vehicle 100 transmitted from the information processing center 400. The check-in information can be transmitted to the position information service center 500 from the navigation device 200 via the information processing center 400, and then utilized by the position information service center 500, another social networking service (SNS), an online game, and the like. Therefore, it is preferred that the position information service center 500 be a facility that fulfills a function of managing and utilizing the position information about the vehicle 100 transmitted from the information processing center 400. The position information service center 500 referred to here corresponds to the "position information service center" of the present invention.

The position information transmission processing performed by the thus-configured navigation device 200 is described below with reference to the drawings. The terminal ECU 210 that fulfills the original navigation function of the navigation device 200 is the main element for executing the position information transmission processing. The "control unit" according to the present invention is configured by this terminal ECU 210.

Position information transmission processing according to a first embodiment of the present invention is described with reference to FIG. 2.

Figure 2:
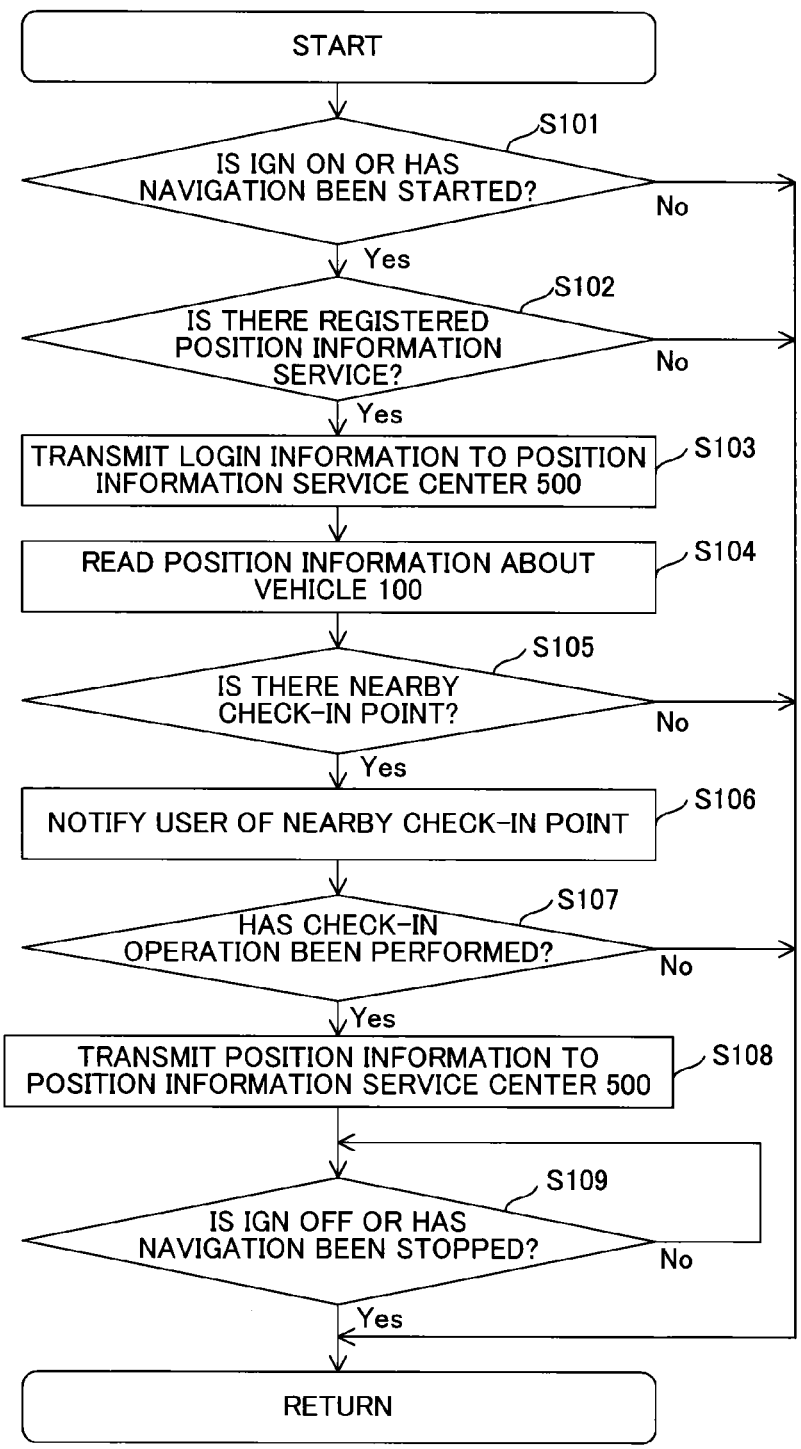
FIG. 2 is a diagram illustrating a flowchart of position information transmission processing according to a first embodiment of the present invention.

According to the flowchart illustrated in FIG. 2, in Step S101, the terminal ECU 210 determines whether or not the ignition device 130 is in an ON state, or, whether or not the navigation device 200 is in an operational state. In the navigation device 200, when the driver or a vehicle occupant (hereinafter also referred to as "user of the vehicle 100 or the navigation device 200", or simply as "user") of the vehicle 100 performs a predetermined start operation, map information relating to a current location or a destination is displayed on the display unit 240. Typically, this start operation is performed by performing an operation such as pressing or pushing a start button of the navigation function or touching a navigation screen. Therefore, whether or not the navigation device 200 is in an operational state is determined by detecting whether or not the above-mentioned start operation has been performed, or whether or not the navigation device 200 has actually been started by this start operation.

When the condition of Step S101 is satisfied (Yes in Step S101), it is determined that the vehicle 100 is in a drive state (is in a traveling or a pre-traveling state) or is in a drive preparation state (also referred to as "entered a vehicle drive mode"), and the processing proceeds to Step S102. When the condition of Step S101 is not satisfied (No in Step S101), the position information transmission processing finishes as is. In other words, when the ignition device 130 is in an ON state, it can be determined that the vehicle 100 is actually in a drive state or a drive preparation state, and when the navigation device 200 is in an operational state, it can be determined that the vehicle 100 is also in a drive state or a drive preparation state.

Note that, other than this Step S101, examples of situations in which the terminal ECU 210 can determine that the vehicle 100 is in a drive state or a drive preparation state (also referred to as "vehicle drive mode") include when the parking brake 170 of the vehicle 100 is in an OFF state, when a traveling speed exceeding a predetermined threshold is detected, or if the navigation device 200 is a mobile device such as a smartphone for example, when pairing between the mobile device and the vehicle 100 is established.

In Step S102, the terminal ECU 210 determines whether or not there is a pre-registered position information service in the navigation device 200. When there is a pre-registered position information service (Yes in Step S102), in Step S103, authentication data (typically, a login ID or data combining a login ID with a password) for account authentication is transmitted to the position information service center 500 for managing the position information service. If a plurality of position information services are registered, it is preferred that authentication data for account authentication be transmitted to the respective position information service centers for managing each position information service. On the other hand, when there is no registered position information service (No in Step S102), the position information transmission processing finishes as is.

In this case, the terminal ECU 210 reads the authentication data for account authentication from the memory of the terminal ECU 210, and transmits the read authentication data to the information processing center 400 via the communication unit 230 and the network 610. In addition, the information processing center 400 transmits the authentication data to the position information service center 500 via the network 640. Consequently, account authentication is performed between the account of the navigation device 200 that is stored in advance in the memory of the terminal ECU 210 and the service account that is pre-registered in the position information service center 500. As a result, a state is formed in which the navigation device 200 is logged in to the position information service center 500, and this login state is subsequently maintained.

Following Step S103, in Step S104, the terminal ECU 210 derives and reads the current position information from the movement information (also referred to as "GPS information") about the vehicle 100 in which the terminal ECU 210 is mounted. Examples of the movement information include information about the current position of the vehicle 100, speed information, time information, and the like. In this case, the position information about the vehicle 100 can be derived based on processing to extract information from among the movement information about the vehicle 100, or based on computation processing applying a predetermined formula and the like on the movement information about the vehicle 100.

In Step S105, the terminal ECU 210 determines whether or not there is a valid check-in point near the vehicle 100 based on the information about the current position of the vehicle 100 read in Step S104. Typically, the terminal ECU 210 receives, via the information processing center 400 and the networks 610 and 640, check-in information relating to check-in points (typically, the position of places, stores, facilities, and the like that the user of a predetermined network service has passed through or arrived at) available to be checked in to and that are stored in the position information service center 500. Further, whether or not there is a check-in point that is near the vehicle 100 and is available to be checked in to (a nearby check-in point) among the check-in points of the position information service center 500 is determined by comparing the information about the current position of the vehicle 100 and the check-in points of the position information service center 500 with each other. When there is a check-in point near the vehicle 100 (Yes in Step S105), the processing proceeds to Step S106. When there is not a check-in point near the vehicle 100 (No in Step S105), the position information transmission processing finishes as is.

In Step S106, the terminal ECU 210 selectively acquires the nearby check-in point present near the vehicle 100 from among the check-in points received from the position information service center 500, and outputs the acquired nearby check-in point for notification to the user of the navigation device 200 (who is also the user of the vehicle 100). As the output means, the nearby check-in point can be output by a display or a spoken output using the display unit 240 of the navigation device 200 or the information terminal 300 (a mobile phone, personal computer (PC), etc.) of a user other than the driver, for example. Consequently, the user can be made aware of a nearby check-in point present near the vehicle 100 by referring to the output information output to the display unit 240 or the information terminal, and if necessary, perform a check-in operation on the nearby check-in point. Therefore, the user can check in by confirming a location that is near the vehicle 100 and available to be checked in to, and then quickly transmitting the position information about the vehicle 100 to the position information service center 500 without missing the location.

In Step S107, the terminal ECU 210 determines whether or not a check-in operation has been performed in a logged-in state to the position information service center 500 in the vehicle drive mode of the vehicle 100. It is determined that a check-in operation has been performed when, for example, a screen for check-in (an operable area) displayed on the display unit 240 has been touched (e.g., a tap operation) by the user, or when a link for checking in included in an E-mail transmitted to a mobile device managed by the user has been selected. The "check-in operation" referred to here is a screen operation on a screen for checking in to a location corresponding to the position information about the vehicle 100, which corresponds to the "predetermined operation" of the present invention. This operation is a single valid operation for simplifying the operations of the user to transmit the position information about the vehicle 100. Consequently, by performing only a check-in operation, the user can easily transmit the position information about the vehicle 100 to the position information service center 500. When the check-in operation has been performed (Yes in Step S107), the processing proceeds to Step S108. When the check-in operation has not been performed (NO in Step S107), the position information transmission processing finishes as is.

In Step S108, the terminal ECU 210 transmits the position information about the vehicle 100 to the position information service center 500 on condition that a check-in operation has been performed in Step S107. Consequently, the fact that the vehicle 100 has checked in to a nearby check-in point is transmitted to the position information service center 500, and is registered in a management server of the position information service center 500. At the position information service center 500, a special benefit that is based on the check-in point can optionally be given to the user by comparing the check-in point of the vehicle 100 registered in Step S108 with the check-in points stored in the management server of the position information service center 500.

In Step S109, the terminal ECU 210 determines whether or not the input unit 130 is in an OFF state, or the navigation device 200 is in a stopped state. When Step S109 is satisfied (Yes in Step S109), the position information transmission processing is ended.

Note that, when performing the position information transmission processing illustrated in FIG. 2, instead of a mode in which the information processing center 400 is arranged between the terminal ECU 210 of the navigation device 200 and the position information service center 500, a mode can also be employed in which information communication is directly performed between the terminal ECU 210 of the navigation device 200 and the position information service center 500, without going through the information processing center 400. In this case, the position information transmission system according to the present invention can be built omitting the information processing center 400 and the related networks. Consequently, the configuration of the position information transmission system can be simplified.

As a modified example of the position information transmission processing according to the first embodiment illustrated in FIG. 2, position information transmission processing that omits Step S105 and Step S106 can be employed. In this case, the user can transmit the position information about his or her vehicle to the position information service center 500 without confirming the check-in points near the vehicle. Consequently, the processing for transmitting position information about the vehicle 100 to the position information service center 500 can be simplified.

The position information transmission processing according to a second embodiment of the present invention is described with reference to FIG. 3.

Figure 3:
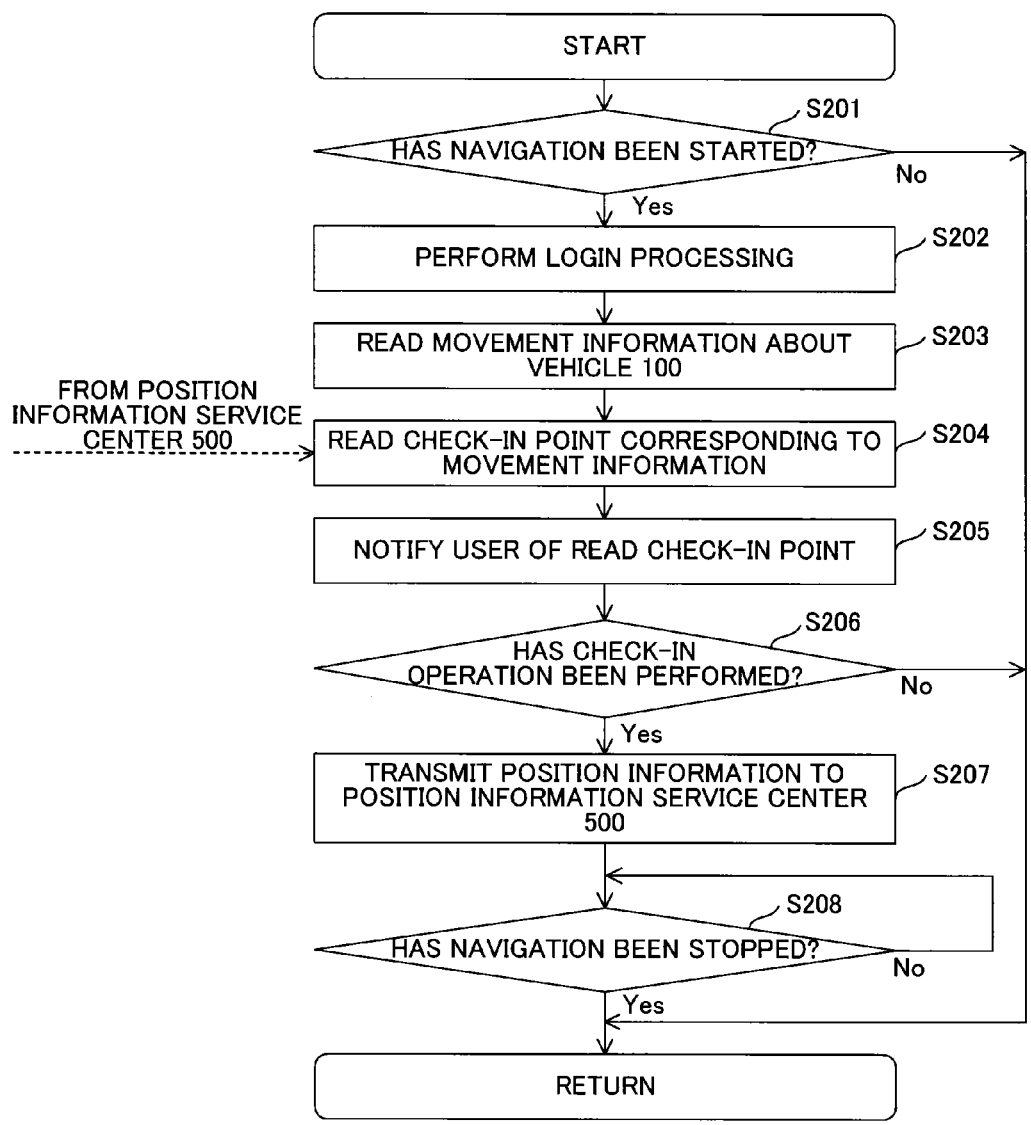
FIG. 3 is a diagram illustrating a flowchart of position information transmission processing according to a second embodiment of the present invention.

According to the flowchart illustrated in FIG. 3, in Step S201, the terminal ECU 210 determines whether or not the navigation device 200 is in an operational state. When the condition of Step S201 is satisfied (Yes in Step S201), it is determined that the vehicle 100 has entered the vehicle drive mode, and the processing proceeds to Step S202. When the condition of Step S201 is not satisfied (No in Step S201), the position information transmission processing finishes as is. In other words, when the navigation device 200 is in an operational state, it can be determined that the vehicle 100 is also in a drive state.

Note that, other than this Step S201, examples of situations in which the terminal ECU 210 can determine that the vehicle 100 has entered the "vehicle drive mode" include when the parking brake 170 of the vehicle 100 is in an OFF state, when a traveling speed exceeding a predetermined threshold is detected, or if the navigation device 200 is a mobile device such as a smartphone for example, when pairing between the mobile device and the vehicle 100 is established. Further, Step S201 can be changed to the above-mentioned Step S101.

In Step S202, the terminal ECU 210 performs processing (log-in processing) for the navigation device 200 to log in to the position information service center 500. In this case, the terminal ECU 210 reads authentication data (typically, a login ID or data combining a login ID with a password) for account authentication from the memory of the terminal ECU 210, and transmits the read authentication data to the information processing center 400 via the communication unit 230 and the network 610. In addition, the information processing center 400 transmits the authentication data to the position information service center 500 via the network 640. Consequently, account authentication is performed between the account of the navigation device 200 that is stored in advance in the memory of the terminal ECU 210 and the service account that is pre-registered in the position information service center 500. As a result, a state is formed in which the navigation device 200 is logged in to the position information service center 500, and this login state is subsequently maintained.

In Step S203, the terminal ECU 210 reads movement information about the vehicle 100 measured by the GPS unit 220. Examples of the movement information include information about the current position of the vehicle 100, speed information, time information, and the like, measured by the GPS unit 220.

In Step S204, the terminal ECU 210 reads from the position information service center 500 position information relating to a check-in point corresponding to the movement information about the vehicle 100 read in Step S203, namely, a location on the movement route of the vehicle 100 determined as being possible to check in to. Consequently, a check-in point is read that is on the movement route of the vehicle 100, and that can give added value or a special benefit to the user by checking in.

In Step S205, the terminal ECU 210 notifies the user of the check-in point read in Step S204, namely, the check-in point corresponding to the movement information of the vehicle 100. In this case, the user can be notified of the check-in point by displaying the check-in point on the information terminal 300 (a mobile phone, personal computer (PC), etc.) of a user other than the driver, for example, or by outputting the check-in point based on a spoken output. Consequently, the user can check in by confirming the check-in point read in Step S204, and then quickly transmitting position information about the vehicle 100 to the position information service center 500 without missing this check-in point.

In Step S206, the terminal ECU 210 determines whether or not a check-in operation has been performed on the check-in point notified in Step S205 in a logged-in state to the position information service center 500 in the vehicle drive mode of the vehicle 100. It is determined that a check-in operation has been performed when, for example, a display area for check-in (an operable area) displayed on the display unit 240 has been touched (e.g., a tap operation) by the user, or when a link for checking in included in an E-mail transmitted to a mobile device managed by the user has been selected. The "check-in operation" referred to here is a screen operation on a screen for checking in to a location corresponding to the position information about the vehicle 100, which corresponds to the "predetermined operation" of the present invention. This operation is a single valid operation for simplifying the operations of the user to transmit the position information about the vehicle 100. Consequently, by performing only a check-in operation, the user can easily transmit the position information about the vehicle 100 to the position information service center 500. When the check-in operation has been performed (Yes in Step S206), the processing proceeds to Step S207. When the check-in operation has not been performed (NO in Step S206), the position information transmission processing finishes as is.

In Step S207, the terminal ECU 210 transmits the position information about the vehicle 100 to the position information service center 500 on condition that a check-in operation has been performed in Step S206. In this case, the position information about the vehicle 100 can be derived based on processing to extract information from among the movement information about the vehicle 100, or based on computation processing applying a predetermined formula and the like on the movement information about the vehicle 100. Note that, other than a mode in which the terminal ECU 210 acts as the main element for deriving the position information about the vehicle 100, a mode can also be employed in which movement information about the vehicle 100 is received by the information processing center 400 from the terminal ECU 210, and the position information about the vehicle 100 is derived from the received movement information. Consequently, the fact that the vehicle 100 has checked in to the check-in point notified in Step S205 is transmitted to the position information service center 500, and is registered in the management server of the position information service center 500. At the position information service center 500, added value or a special benefit that is based on the check-in point can optionally be given to the user by comparing the check-in point of the vehicle 100 registered in Step S207 with the check-in points stored in the management server of the position information service center 500.

In Step S208, the terminal ECU 210 determines whether or not the navigation device 200 is in a stopped state. When Step S208 is satisfied (Yes in Step S208), the position information transmission processing is ended. Note that, Step S208 can be changed to the above-mentioned Step S109.

Note that, when performing the above-mentioned position information transmission processing illustrated in FIG. 3, at least one of the navigation device 200, the information terminal 300, the information processing center 400, and the position information service center 500 can serve as the main control element.

As a modified example of the position information transmission processing according to the second embodiment illustrated in FIG. 3, position information transmission processing that omits Step S204 and Step S205 can be employed. In this case, the user can transmit the position information about his or her vehicle to the position information service center 500 without confirming the check-in point corresponding to the movement information about the vehicle. Consequently, the processing for transmitting position information about the vehicle 100 to the position information service center 500 can be simplified.

Relating to the above-mentioned Step S107 and Step S206, it is preferred that on the display unit 240, a touch-operated first screen for checking in be displayed on the same display area as a second screen that fulfills a function other than check in. Consequently, when the second screen that fulfills a function other than check in is displayed, the first screen for checking in is automatically displayed. Therefore, the first screen for checking in can be easily displayed without a dedicated screen for information transmission starting an application during driving. Specific examples of this case are described with reference to FIG. 4 and FIG. 5.

Figure 4:
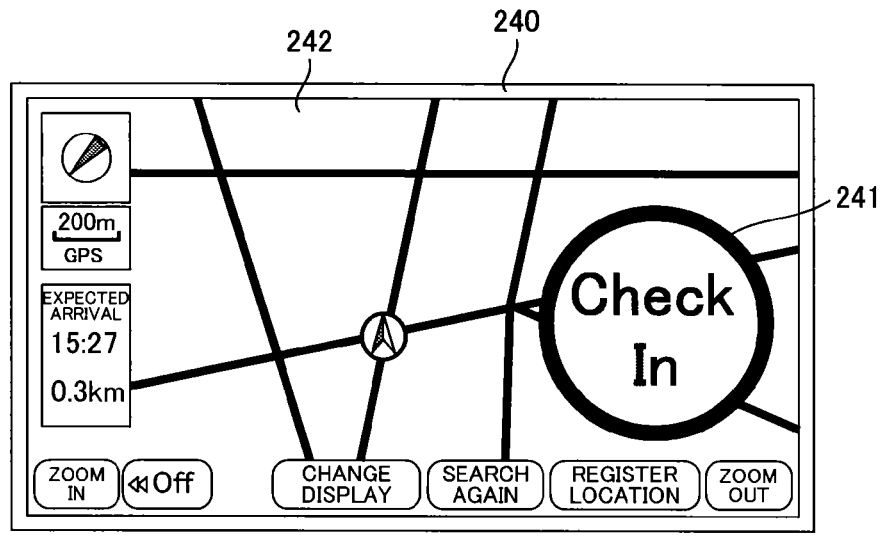
FIG. 4 is a diagram illustrating a display example on a display unit 240 of a navigation device 200.

In the embodiment illustrated in FIG. 4, the terminal ECU 210 displays a first screen 241 and a second screen 242 of the display unit 240 on the same display area by superimposing (overlapping) the first screen 241 on the second screen 242 for display. In this case, the first screen 241 is an operation area that is operated by the user in order to check in. The letters "Check In", for example, are displayed across the whole of this operation area. When a touch operation (e.g., a tap operation) on those letters is detected, in Step S107 and Step S206, it is determined that "a check-in operation has been performed". Note that, the display content of the first screen 241 is not limited to the letters "Check In". The display content may be appropriately selected as necessary. On the other hand, the second screen 242 is a screen that displays map information along with information about the current position of the vehicle 100 for route guidance of the vehicle 100. According to this display mode, the first screen 241 for checking in can be easily displayed during driving without changing the size or the display content of the second screen 242.

Relating to the above-mentioned display mode, the first screen 241 may be displayed superimposed on the second screen 242 in a state in which the second screen 242 is already displayed, or the first screen 241 and the second screen 242 may be simultaneously displayed so that the first screen 241 is superimposed on the second screen 242. Further, to enable the user to identify the first screen 241 more easily, the first screen 241 can also be displayed using characters, fonts, colors, and the like that make the first screen 241 stand out more than the second screen 242.

Figure 5:
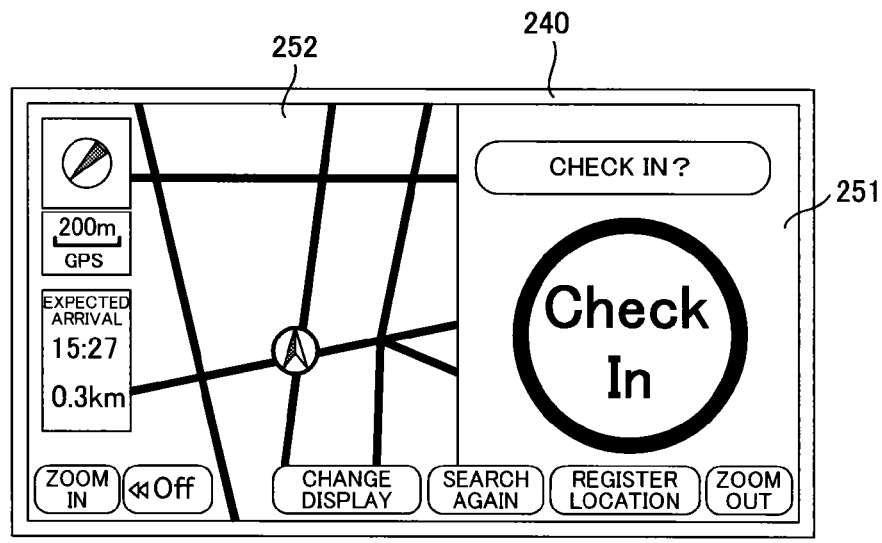
FIG. 5 is a diagram illustrating a display example on the display unit 240 of the navigation device 200.

In an embodiment illustrated in FIG. 5, the terminal ECU 210 displays a first screen 251 and a second screen 252 of the display unit 240 in the same display area by roughly equally splitting one screen having a predetermined area into at least the first screen 251 and the second screen 252. In this case, the first screen 251 is an operation area that is operated by the user in order to check in. The letters "Check In", for example, are displayed across the part of this operation area. When a touch operation (e.g., a tap operation) on those letters is detected, in Step S107 and Step S206, it is determined that "a check-in operation has been performed". Note that, the display content of the first screen 251 is not limited to the letters "Check In". The display content may be appropriately selected as necessary. On the other hand, as in the above-mentioned second screen 242, the second screen 252 is a screen that displays map information along with information about the current position of the vehicle 100 for route guidance of the vehicle 100. According to this display mode, the first screen 251 for checking in can be easily displayed alongside the second screen 252 during driving. Therefore, the user can identify the first screen 251 for check in about as easily as the second screen 252.

Relating to the above-mentioned display mode, in a state in which the second screen 252 matching one screen having a predetermined size is already displayed, the one screen may be split into the first screen 251 and the second screen 252. Alternatively, the first screen 251 and the second screen 252 may be displayed simultaneously in a state in which one screen having a predetermined size is split into the first screen 251 and the second screen 252. Further, to enable the user to identify the first screen 251 more easily, the first screen 251 can also be displayed using characters, fonts, colors, and the like that make the first screen 251 stand out more than the second screen 252, and the first screen 251 can also be displayed in a larger size than the second screen 252.

As a modified example of the display modes of FIG. 4 and FIG. 5, a screen displaying information from a source (audio device, television, radio, VTR, etc.) other than route guidance can be employed as the second screens 242 and 252 in the navigation device 200. Further, as another modified example, just the first screen 241 or just the first screen 251 may be displayed across the whole display area of the display unit 240. In addition, relating to FIG. 5, one screen having a predetermined size of the display unit 240 may be split into at least three split screens so that the content of the above-mentioned first screen 251 is displayed on a first split screen, the content of the above-mentioned second screen 252 is displayed on a second split screen, and the above-mentioned source information other than route guidance is displayed on a third split screen.

In the embodiments of FIG. 4 and FIG. 5, a tap operation is described as an example of the screen operation on the display unit 240. However, screen operations such as a flick operation, a swipe operation, a pinch operation, a scroll operation, and a drag operation can also be used instead of, or in addition to, the tap operation.

Thus, as described above, the position information about the vehicle 100 can be easily transmitted to the position information service center 500 by using the thus-configured navigation device 200 and the position information transmission system 10. Consequently, there is no need for the user performing information transmission in the vehicle to take a measure such as stopping the vehicle. Further, because only position information selectively acquired from among the movement information about the vehicle 100 is transmitted to the position information service center 500, the privacy of the user can be ensured. In this case, it is preferred that the position information about the vehicle 100 transmitted to the position information service center 500 be utilized by one or a plurality of social networking services (SNSs) and the like as position information (so-called check-in information) about a place, store, facility, and the like that the user has passed through or arrived at, or be utilized to give a special benefit to the user on an online game and the like.

The present invention is not limited to just the above-mentioned typical embodiments, and various applications and modifications may be made. For example, the following respective embodiments applying the above-mentioned embodiments can be carried out.

In the above-mentioned Step S107 and Step S206, as the condition for transmitting position information about the vehicle 100 to the position information service center 500, a separate operation can be employed that is different from the above-mentioned check-in operation by the navigation device 200. For example, the position information about the vehicle 100 may be transmitted to the position information service center 500 on condition that a voice input has been input to a voice input unit of the navigation device 200 or the information terminal 300, or that specific switches provided on the steering wheel of the vehicle 100 have been operated.

In the above-mentioned embodiments, processing is described in which position information is derived from movement information about the vehicle 100 measured by the GPS unit 220, and then this position information is transmitted to the position information service center 500. However, in the present invention, processing that transmits directly input position information about the vehicle 100 as is to the position information service center 500 can also be employed.

In the above-mentioned embodiments, a navigation device 200 that can be used in the vehicle is described as an example of the position information transmission apparatus. However, in the present invention, an information terminal 300 (a mobile phone (including a smartphone), a personal computer (PC), etc.) that can be used not only in the vehicle but in the home and the like may also be used as the position information transmission apparatus. For example, when a home information terminal 300 is used as the position information transmission apparatus, the user of the information terminal 300 can input position information relating to a location that the user has traveled through in the vehicle 100 in the past, namely, virtual position information, from the information terminal 300, and transmit that information to the position information service center 500.

In the above-mentioned embodiments, the terminal ECU 210 of the navigation device 200 is described for a case in which, in a logged-in state to the position information service center 500, position information about the vehicle 100 is transmitted to the position information service center 500 on condition that a predetermined operation has been performed. However, in the present invention, in a state in which the terminal ECU 210 is logged in to the position information service center 500, the terminal ECU 210 may also transmit the position information about the vehicle 100 to the position information service center 500 on condition that, after a predetermined operation has been performed, the vehicle 100 is in a drive state or a drive preparation state.

In this case, the predetermined operation may be an operation in which once a touch operation (e.g., a tap operation) of the letters such as "Check In" is performed, the subsequent check-in becomes a reservation, and each time the vehicle 100 passes through a nearby check-in point, the vehicle 100 automatically checks in at that check-in point. Consequently, the user can automatically transmit the position information about the vehicle 100 to the position information service center 500 without performing a special operation. Further, in this case, it is preferred to derive the position information corresponding to the movement information from the movement information relating to movement of the vehicle 100, and transmit the derived position information to the position information service center 500. Consequently, information communication is realized in which consideration is given to the privacy of the user without transmitting all of the movement information about the vehicle 100 to the position information service center 500.

As another embodiment, in a state in which the terminal ECU 210 is logged in to the position information service center 500, the terminal ECU 210 may transmit the position information about the vehicle 100 to the position information service center 500 without a predetermined operation being performed. In this case, by omitting the predetermined operation, the processing for transmitting the position information about the vehicle 100 to the position information service center 500 is even simpler.

Relating to the above-mentioned Step S104 and Step S204, when the user sets the movement route of the vehicle 100 before driving or at home, the user can acquire in advance a list in which a plurality of check-in points are registered. At this stage, a check-in method can be employed in which, when the vehicle 100 has entered the vehicle drive mode, or also when a predetermined operation has been performed by the user, the vehicle 100 automatically checks in to all or a part of the check-in points selected from the list. In this case, the automatically checked in check-in points may be all of the check-in points that are available to be checked in to with a predetermined social networking service (SNS), check-in points that the user has not checked in to in the past that are derived based on a check-in history of the user, or even the check-in points that are useful in progressing to a better position in a predetermined online game (e.g., points that enable an item to be received by checking in). Further, the user may also select the check-in method for each social networking service.

In the above-mentioned embodiments, a case is described in which the terminal ECU 210 of the navigation device 200 logs in to the position information service center 500 when transmitting the position information about the vehicle 100 to the position information service center 500. However, in the present invention, position information about the vehicle 100 may be transmitted to the position information service center 500 from the information processing center 400, without the terminal ECU 210 logging in to the position information service center 500.

In this case, the terminal ECU 210 of the navigation device 200 is connected via the network 640 to the information processing center 400, which stores position information about the vehicle 100 in cooperation with the position information service center 500. In other words, the information processing center 400 and the position information service center 500 are linked. Further, the terminal ECU 210 outputs a control signal to the information processing center 400 so that the position information about the vehicle 100 is transmitted from the information processing center 400 to the position information service center 500 on condition that a predetermined operation like that described above has been performed. This enables transmission of the position information about the vehicle 100 to the position information service center 500 to be carried out only based on the user's intention. Hence, the position information about the vehicle 100 can be prevented from always being transmitted to the position information service center 500. In this case, position information about the vehicle 100 can be transmitted from the information processing center 400 to the position information service center 500 by a simple operation without the terminal ECU 210 directly accessing the position information service center 500.

Further, it is preferred that the terminal ECU 210 acquire and output the nearby check-in point that is near the vehicle 100 and is available to be checked in to from the information processing center via a network. In this case, the nearby check-in point may be stored in the information processing center 400, or may be stored in the position information service center 500. Consequently, the user can check in by quickly transmitting the position information about the vehicle 100 to the position information service center 500 without missing the nearby check-in point. In addition, it is preferred that the terminal ECU 210 output a control signal to the information processing center 400 so that the information processing center 400 derives the position information from movement information relating to movement of the vehicle 100, and transmits the derived position information to the position information service center 500. Consequently, information communication can be performed in which consideration is given to privacy, because not all of the movement information about the vehicle 100 is transmitted as is to the external position information service center 500.

Figure 6:
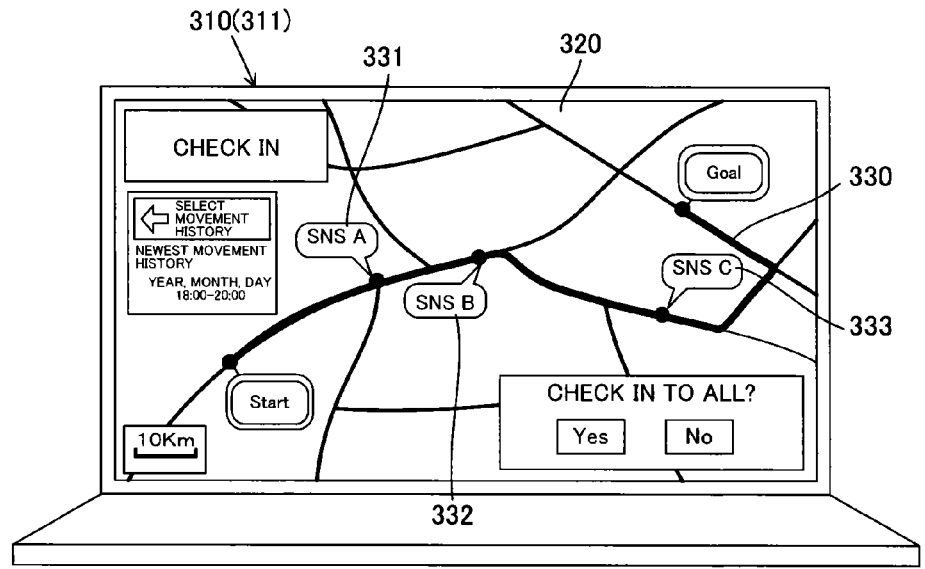
FIG. 6 is a diagram illustrating a display example on a display unit 320 of a personal computer 310.
Figure 7:
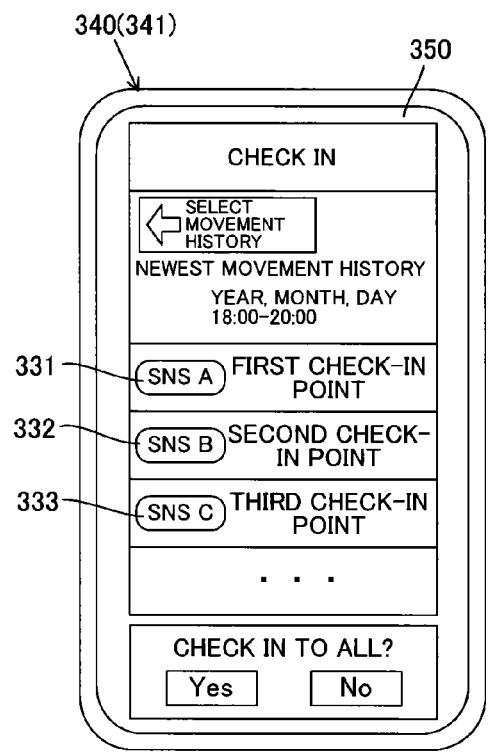
FIG. 7 is a diagram illustrating a display example on a display unit 350 of a smartphone 340.

Rather than using the navigation device 200 to check in as illustrated in FIG. 4 and FIG. 5, the user can also check in using an information terminal, such as a personal computer or a smartphone, instead of, or in addition to, the navigation device 200, as illustrated in FIG. 6 and FIG. 7.

In an embodiment illustrated in FIG. 6, a screen relating to check in is displayed on a display unit 320 of a personal computer 310, which is one information terminal 300. In this case, the personal computer 310, which is a position information transmission apparatus for transmitting the position information about the vehicle 100 to the position information service center 500, includes a terminal ECU 311 (control unit) that is connected via the network 620 to the information processing center 400, which stores a movement history of the vehicle 100 in cooperation with the position information service center 500. Similar to the above-mentioned terminal ECU 210, the terminal ECU 311 includes a microcomputer configured from a CPU, a ROM, a RAM, and the like, as a main component part.

Here, the terminal ECU 311 is configured to, when the movement history stored in the information processing center 400 is retrieved, acquire and output via the network 620 the check-in points that are available to be checked in to and are included in the movement history. A typical example of the "movement history" referred to here includes past movement routes (movement locations) of the vehicle 100. In FIG. 6, when the most recent movement history (also referred to as "travel history") 330 of the vehicle 100 is retrieved, check-in points 331, 332, and 333 that are included in the movement history 330 and available to be checked in to are acquired via the network 620 and output to the display unit 320. Further, a movement history other than the displayed movement history 330 can be selected on the display unit 320.

The movement history 330 in FIG. 6 represents a movement route from the "Start" to the "Goal" (route indicated by the thick line). This movement route is output to the display unit 320 along with map information. The check-in point 331 is a check-in point that is registered in "SNS A", which is a first social networking service. Further, the check-in point 332 is a check-in point that is registered in "SNS B", which is a second social networking service. In addition, the check-in point 333 is a check-in point that is registered in "SNS C", which is a third social networking service.

Further, the terminal ECU 311 outputs a control signal to the information processing center 400 so that the position information corresponding to a designated check-in point is output from the information processing center 400 to the position information service center 500 on condition that an operation for designating all or a part of the plurality of check-in points 331, 332, and 333 has been performed. For example, when the user designates the check-in point 331 by clicking on the display of the check-in point 331 on the screen, the position information corresponding to the check-in point 331 is transmitted from the information processing center 400 to the position information service center 500, and check in is carried out at "SNS A".

The terminal ECU 311 also fulfills a function of outputting information urging an operation for designating the output check-in point. In this case, it is preferred that the information be output by a display or a spoken output. For example, as illustrated in FIG. 6, the message "Check in to all?" is output on the display unit 320. When the user clicks on the "Yes" displayed in this message box, check in is performed to all of the network services that the respective check-in points displayed on the screen are registered to. Consequently, a smoother check-in operation by the user is realized.

In an embodiment illustrated in FIG. 7, a screen relating to check in is displayed on a display unit 350 of a smartphone 340, which is one information terminal 300. In this case, the smartphone 340, which is a position information transmission apparatus for transmitting the position information about the vehicle 100 to the position information service center 500, includes a terminal ECU 341 (control unit) that is similar to the above-mentioned terminal ECU 311.

Here, like the above-mentioned terminal ECU 311, the terminal ECU 341 is configured to, when the movement history stored in the information processing center 400 is retrieved, acquire and output via the network 620 the check-in points that are available to be checked in to and are included in the movement history. In FIG. 7, when the most recent movement history of the vehicle 100 is retrieved, for example, the check-in points 331, 332, and 333 of FIG. 6 are acquired via the network 620 and output to the display unit 350. Further, a movement history other than the displayed movement history can be selected on the display unit 350.

For example, when the user designates the check-in point 331 by clicking on the display of the check-in point 331 on the screen, the position information corresponding to the designated check-in point 331 is transmitted from the information processing center 400 to the position information service center 500, and check in is carried out at "SNS A". Alternatively, check in is performed to all of the network services that the respective check-in points displayed on the screen are registered to by the user tapping the "Yes" displayed in a check-in to all message box.

Therefore, according to the embodiments of FIG. 6 and FIG. 7, particularly after the user has stopped driving the vehicle 100, the user can refer to check-in points that are available to be checked in to and are included in the movement history of the vehicle 100, by using the information terminal 300 to access the information processing center 400. In particular, according to the embodiment of FIG. 6, the user can refer to the check-in points included in the movement history on a map. Further, a vehicle occupant other than the driver can refer to the check-in points included in the movement history even while the vehicle 100 is being driven. The user can check in to the designated check-in point at a later time. Therefore, the user can transmit the position information about the vehicle 100 to the position information service center 500 only based on the user's intention in view of his/her past driving history. Hence, the position information about the vehicle 100 can be prevented from always being transmitted to the position information service center 500. In this case, the user transmits only the information that is required for checking in to his/her desired check-in point, which means that information communication can be performed in which consideration is given to privacy. Further, the position information about the vehicle 100 can be transmitted to the position information service center 500 from the information processing center 400 based on a simple operation, without the information terminal 300 directly accessing the position information service center 500.

As a modified example of the embodiments of FIG. 6 and FIG. 7, when each of the check-in points 331, 332, and 333 is clicked on or tapped, information about a special benefit, such as an item, to be given to the user at that place may be displayed on the display unit 320 or 350. In this case, it is preferred that a selection key enabling the selection/deselection of a check-in point by the user be displayed on the display unit 320 or 350. As a result, the user can select whether or not to check in based on whether the special benefit is desirable or not.

Figure 8:
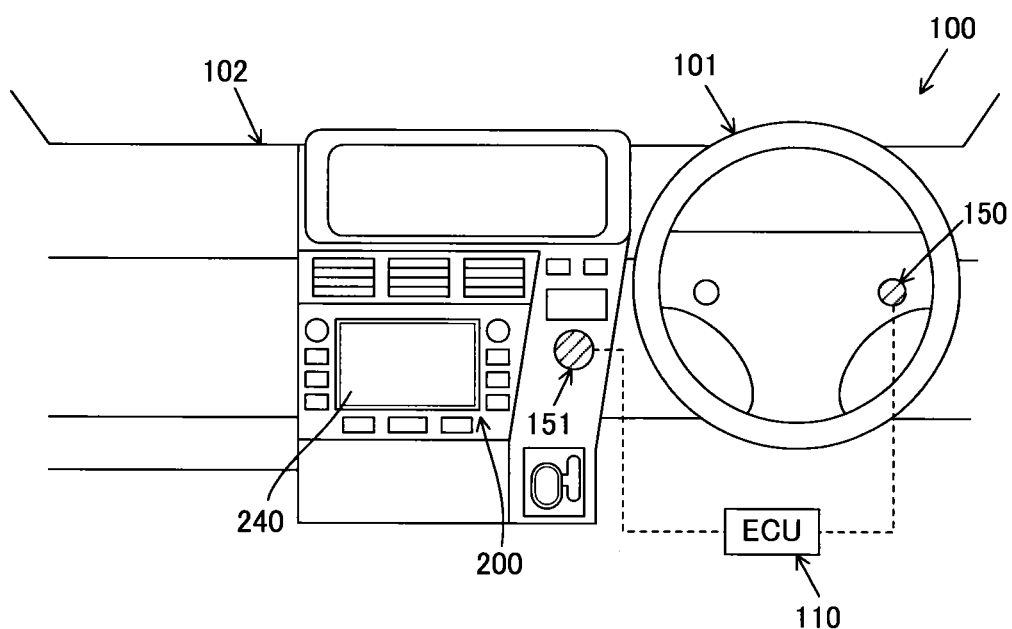
FIG. 8 is a diagram illustrating, in a vehicle 100, a steering switch 150 provided on a steering wheel 101 and a panel switch 151 provided on an instrument panel 102.

Next, with reference to FIG. 8, a case is described in which check in is performed using a hardware button provided on at least one of a steering wheel 101 and an instrument panel 102 of the vehicle 100. The steering wheel 101 is a part for steering the vehicle. Further, the instrument panel 102 is configured from all or a part of the mounted internal parts, such as the steering wheel 101, a dashboard, gauges, the display unit 240 of the navigation device 200, an audio system, a glove compartment, a passenger seat airbag, and the like. Further, examples of the "hardware button" include various operating buttons that act as physical or mechanical component elements.

The steering wheel 101 includes a steering switch 150 as a hardware button that can be operated by pressing. The instrument panel 102 includes a panel switch 151 as a hardware button that can be operated by pressing. The steering switch 150 and the panel switch 151 are both connected to the vehicle ECU 110 (control unit). The steering switch 150 may be a switch that is pre-installed in the steering wheel 101, for example, or may be a switch on a steering remote control that is mounted on the steering wheel 101 later. The steering switch 150 and the panel switch 151 correspond to the "hardware button" of the present invention.

Here, the vehicle ECU 110 is configured to, when the steering switch 150 or the panel switch 151 has been pressed as the predetermined operation, transmit the position information corresponding to a location that the vehicle is traveling through when the hardware button is pressed in order to check in to the location, for example, from the information processing center 400 to the position information service center 500. In this case, the hardware button may be a check-in-dedicated button that fulfills only a check-in function, or may be a button having assigned thereto a check-in function and one or a plurality of functions that are different from the check-in function. Further, the above-mentioned check-in function may also be assigned to a hardware button to which a predetermined one of a plurality of functions can be assigned. Consequently, the vehicle occupant can check in by pressing the hardware button, which is a single operation, to simply transmit the position information about the vehicle 100 to the position information service center 500. Note that, one of the steering switch 150 and the panel switch 151 may optionally be omitted.

In the embodiment illustrated in FIG. 8, it is preferred that the vehicle ECU 110 output the nearby check-in point that is near the vehicle 100 and is available to be checked in to along with map information to the display unit 240 of the navigation device 200. In this case, the nearby check-in point may be stored in the position information service center 500, or may be stored in the information processing center 400. Consequently, the vehicle occupant can check in by quickly transmitting the position information about the vehicle 100 to the position information service center 500, without missing the nearby check-in point.

In the present invention, each of the following aspects can be adopted based on the descriptions in the above-mentioned embodiments and various modified examples thereof.

In the present invention, the following aspect (Aspect 1) can be employed.

"A position information transmission method for transmitting position information about a vehicle to a position information service center, including transmitting, in a logged-in state to the position information service center, the position information to the position information service center on condition that a predetermined operation has been performed."

In the present invention, the following aspect (Aspect 2) can be employed.

"A position information transmission method according to Aspect 1, further including selectively acquiring and outputting a nearby check-in point that is near the vehicle and is available to be checked in to from among check-in points that are available to be checked in to and are stored in the position information service center."

In the present invention, the following aspect (Aspect 3) can be employed.

"A position information transmission method according to Aspect 1 or 2, further including deriving the position information from movement information relating to movement of the vehicle and transmitting the derived position information to the position information service center."

In the present invention, the following aspect (Aspect 4) can be employed.

"A position information transmission method for transmitting position information about a vehicle to a position information service center, including outputting a control signal to an information processing center for storing the position information about the vehicle in cooperation with the position information service center so that the information processing center transmits the position information to the position information service center on condition that a predetermined operation has been performed."

In the present invention, the following aspect (Aspect 5) can be employed.

"A position information transmission method according to Aspect 4, further including acquiring and outputting from the information processing center a nearby check-in point that is near the vehicle and is available to be checked in to."

In the present invention, the following aspect (Aspect 6) can be employed.

"A position information transmission method according to Aspect 4 or 5, further including outputting a control signal to the information processing center so that the information processing center derives the position information from movement information relating to movement of the vehicle and transmits the derived position information to the position information service center."

In the present invention, the following aspect (Aspect 7) can be employed.

"A position information transmission method according to any one of Aspects 1 to 6, in which the predetermined operation is a screen operation on a first screen for checking in to a location corresponding to the position information, and in which the position information transmission method further includes displaying the first screen on the same display area as a second screen that fulfills a function other than check in."

In the present invention, the following aspect (Aspect 8) can be employed.

"A position information transmission method according to Aspect 7, further including displaying the first screen on the same display area as the second screen by superimposing the first screen on the second screen for display."

In the present invention, the following aspect (Aspect 9) can be employed.

"A position information transmission method according to Aspect 7, further including displaying the first screen on the same display area as the second screen by splitting one screen having a predetermined size into at least the first screen and the second screen for display."

In the present invention, the following aspect (Aspect 10) can be employed.

"A position information transmission method for transmitting position information about a vehicle to a position information service center, the method including:

selectively acquiring and outputting, from among check-in points that are available to be checked in to and are stored in an information processing center for storing a movement history of the vehicle in cooperation with the position information service center, a check-in point included in the movement history; and outputting, on condition that an operation for designating the output check-in point has been performed, a control signal to the information processing center so that position information corresponding to the designated check-in point is transmitted from the information processing center to the position information service center."

In the present invention, the following aspect (Aspect 11) can be employed.

"A position information transmission method according to Aspect 10, further including outputting the acquired check-in point along with map information to a display unit."

In the present invention, the following aspect (Aspect 12) can be employed.

"A position information transmission method according to Aspect 10 or 11, further including outputting information that urges transmission of the position information to the position information service center."

In the present invention, the following aspect (Aspect 13) can be employed.

"A position information transmission apparatus for transmitting position information about a vehicle to a position information service center, the position information transmission apparatus including a control unit that is authorized to log in to the position information service center via a network, the control unit being configured to, in a logged-in state to the position information service center, transmit the position information about the vehicle to the position information service center."

In the present invention, the following aspect (Aspect 14) can be employed.

"A position information transmission apparatus according to Aspect 13, in which the control unit derives the position information from movement information about the vehicle and transmits the derived position information to the position information service center."

In the present invention, the following aspect (Aspect 15) can be employed.

"A position information transmission system for transmitting position information about a vehicle to a position information service center, the position information transmission system including:

a movement information detection apparatus for detecting movement information about the vehicle;

a position information service center to which the movement information detection apparatus is connected via a network in a manner that enables the movement information detection apparatus to log in to the position information service center; and a control unit for deriving, in a state in which the movement information detection apparatus is logged in to the position information service center, position information corresponding to the movement information from the movement information detected by the movement information detection apparatus, and transmitting the derived position information to the position information service center."

The invention claimed is:

1. A position information transmission apparatus for transmitting position information about a vehicle to a position information service center, the position information service center enabling a user to check in to a location of a plurality of predetermined locations by the user submitting information relating to the location of the plurality of predetermined locations, the position information transmission apparatus comprising:

a control unit that is configured to log in to the position information service center via a network, wherein under a condition that the control unit is in a logged-in state to the position information service center, the control unit is configured to:

when it is determined that the vehicle is near the location of the plurality of predetermined locations, provide an option to the user to check-in to the location of the plurality of predetermined locations;

when it is determined that the vehicle is not near the plurality of predetermined locations, fail to provide the option to the user to check-in to the plurality of predetermined locations; and when the user, after being provided with the option to check-in, selects the option to check-in to the location of the plurality of predetermined locations, submit the information relating to the location of the plurality of predetermined locations to the position information service center to check-in the user to the location of the plurality of predetermined locations, the information is based upon the position information about the vehicle, and check-in includes sharing information related to the location of the plurality of predetermined locations with other users.

2. The position information transmission apparatus according to claim 1, wherein the control unit is configured to:

acquire via the network a nearby location of the plurality of predetermined locations that is near the vehicle and is available to be checked in to from among the plurality of predetermined locations that are stored in the position information service center, and cause a display to display the nearby location.

3. The position information transmission apparatus according to claim 1, wherein the control unit derives the position information about the vehicle from movement information relating to movement of the vehicle.

4. A position information transmission apparatus for transmitting position information about a vehicle to a position information service center, the position information service center enabling a user to check in to a location of a plurality of a predetermined locations by the user submitting information relating to the location of the plurality of predetermined locations, the position information transmission apparatus comprising:

a control unit connected via a network to an information processing center for storing the position information about the vehicle in cooperation with the position information service center, wherein the control unit is configured to:

when it is determined that the vehicle is near the location of the plurality of predetermined locations, provide an option to the user to check-in to the location of the plurality of predetermined locations;

when it is determined that the vehicle is not near the plurality of predetermined locations, fail to provide the option to the user to check-in to the plurality of predetermined locations; and when the user, after being provided with the option to check-in, selects the option to check-in to the location of the plurality of predetermined locations, output a control signal to the information processing center so that the information relating to the location of the plurality of predetermined locations of the user is submitted from the information processing center to the position information service center to check-in the user to the location of the plurality of predetermined locations, the information is based upon the position information about the vehicle, and check-in includes sharing information related to the location of the plurality of predetermined locations with other users.

5. The position information transmission apparatus according to claim 4, wherein the control unit is configured to:
acquire via the network from the information processing center a nearby location of the plurality of predetermined locations that is near the vehicle and is available to be checked in to, and
cause a display to display the nearby location.

6. The position information transmission apparatus according to claim 4, wherein the control unit is configured to output a control signal to the information processing center so that the information processing center derives the position information about the vehicle from movement information relating to movement of the vehicle and transmits the derived position information to the position information service center.

7. The position information transmission apparatus according to claim 1, wherein
selecting the option to check-in to the location of the plurality of predetermined locations includes a screen operation on a first screen for checking in to a location corresponding to the position information about the vehicle, and
the control unit is configured to display the first screen on a same display area as a second screen that fulfills a function other than check-in.

8. The position information transmission apparatus according to claim 7, wherein the control unit is configured to display the first screen on the same display area as the second screen by superimposing the first screen on the second screen.

9. The position information transmission apparatus according to claim 7, wherein the control unit is configured to display the first screen on the same display area as the second screen by splitting one screen having a predetermined size into at least the first screen and the second screen.

10. A position information transmission apparatus for transmitting position information about a vehicle to a position information service center, the position information service center enabling a user to check in to a location of a plurality of a predetermined locations by the user submitting information relating to the location of the plurality of predetermined locations, the position information transmission apparatus comprising:
a control unit connected via a network to an information processing center for storing a movement history of the vehicle in cooperation with the position information service center, wherein
the control unit is configured to:
retrieve a movement history stored in the information processing center;
when it is determined that the vehicle is near the location of the plurality of predetermined locations and the location of the plurality of predetermined locations is included in the movement history, provide an option to the user to check-in to the location of the plurality of predetermined locations;
when it is determined that the vehicle is not near the plurality of predetermined locations, fail to provide the option to the user to check-in to the plurality of predetermined locations; and
when the user, after being provided with the option to check-in, selects the option to check-in to the location of the plurality of predetermined locations,
output a control signal to the information processing center so that the information relating to the location of the plurality of predetermined locations of the user is submitted from the information processing center to the position information service center to check-in the user to the location of the plurality of predetermined locations,
the information is based upon the position information about the vehicle, and
check-in includes sharing information related to the location of the plurality of predetermined locations with other users.

11. The position information transmission apparatus according to claim 10, wherein the control unit is configured to output the location of the plurality of predetermined locations along with map information to a display unit.

12. The position information transmission apparatus according to claim 10, wherein the control unit is configured to output information urging the user to check-in to the location of the plurality of predetermined locations.

13. A position information transmission system for transmitting position information about a vehicle to a position information service center, the position information service center enabling a user to check in to a location of a plurality of a predetermined locations by the user submitting information relating to the location of the plurality of predetermined locations, the position information transmission system comprising:
a movement information detection apparatus configured to detect movement information relating to movement of the vehicle;
a position information service center to which the movement information detection apparatus is connected via a network in a manner that enables the movement information detection apparatus to log in to the position information service center; and
a control unit configured, in a state in which the movement information detection apparatus is logged in to the position information service center, to:
derive position information corresponding to the movement information from the movement information detected by the movement information detection apparatus;
when it is determined that the vehicle is near the location of the plurality of predetermined locations, provide an option to the user to check-in to the location of the plurality of predetermined locations;
when it is determined that the vehicle is not near the plurality of predetermined locations, fail to provide the option to the user to check-in to the plurality of predetermined locations; and
when the user, after being provided with the option to check-in, selects the option to check-in to the location of the plurality of predetermined locations, submit the information relating to the location of the plurality of predetermined locations to the position information service center to check-in the user to the location of the plurality of predetermined locations, wherein
the information is based upon the derived position information, and
check-in includes sharing information related to the location of the plurality of predetermined locations with other users.

14. The position information transmission system according to claim 13, wherein the control unit is configured to:
acquire a nearby location of the plurality of predetermined locations that is near the vehicle and is available to be checked in to from among check-in points that are stored in the position information service center, and cause a display to display the nearby location.

15. The position information transmission system according to claim 13, wherein the control unit is provided in the movement information detection apparatus, and is configured to derive, with the movement information detection apparatus, the position information corresponding to the movement information from the movement information detected by the movement information detection apparatus.

16. A position information transmission system for transmitting position information about a vehicle to a position information service center, the position information service center enabling a user to check in to a location of a plurality of predetermined locations by the user submitting information relating to the location of the plurality of predetermined locations, the position information transmission system comprising:
an information processing center for storing the position information about the vehicle in cooperation with the position information service center; and
a control unit connected via a network to the information processing center and configured to:
when it is determined that the vehicle is near the location of the plurality of predetermined locations, provide an option to the user to check-in to the location of the plurality of predetermined locations;
when it is determined that the vehicle is not near the plurality of predetermined locations, fail to provide the option to the user to check-in to the plurality of predetermined locations; and
when the user, after being provided with the option to check-in, selects the option to check-in to the location of the plurality of predetermined locations, output a control signal to the information processing center so that the information relating to the location of the plurality of predetermined locations of the user is submitted from the information processing center to the position information service center to check-in the user to the location of the plurality of predetermined locations, wherein
the information is based upon the position information about the vehicle, and
check-in includes sharing information related to the location of the plurality of predetermined locations with other users.

17. The position information transmission system according to claim 16, wherein the control unit is configured to:
acquire via the network from the information processing center a nearby location of the plurality of predetermined locations that is near the vehicle and is available to be checked in to, and
cause a display to display the nearby location.

18. The position information transmission system according to claim 16, wherein the control unit is configured to output a control signal to the information processing center so that the information processing center derives the position information about the vehicle from movement information relating to movement of the vehicle and transmits the derived position information to the position information service center.

19. The position information transmission system according to claim 13, wherein
selecting the option to check-in to the location of the plurality of predetermined locations includes a screen operation on a first screen for checking in to a location corresponding to the position information about the vehicle, and
the control unit is configured to display the first screen on a same display area as a second screen that fulfills a function other than check-in.

20. The position information transmission system according to claim 19, wherein the control unit is configured to display the first screen on the same display area as the second screen by superimposing the first screen on the second screen.

21. The position information transmission system according to claim 19, wherein the control unit is configured to display the first screen on the same display area as the second screen by splitting one screen having a predetermined size into at least the first screen and the second screen.

22. A position information transmission system for transmitting position information about a vehicle to a position information service center, the position information service center enabling a user to check in to a location of a plurality of predetermined locations by the user submitting information relating to the location of the plurality of predetermined locations, the position information transmission system comprising:
an information processing center for storing a movement history of the vehicle in cooperation with the position information service center; and
a control unit connected via a network to the information processing center and configured to:
retrieve a movement history stored in the information processing center; when it is determined that the vehicle is near the location of the plurality of predetermined locations and the location of the plurality of predetermined locations is included in the movement history, provide an option to the user to check-in to the location of the plurality of predetermined locations;
when it is determined that the vehicle is not near the plurality of predetermined locations, fail to provide the option to the user to check-in to the plurality of predetermined locations; and
when the user, after being provided with the option to check-in, selects the option to check-in to the location of the plurality of predetermined locations, output a control signal to the information processing center so that the information relating to the location of the plurality of predetermined locations of the user is submitted from the information processing center to the position information service center to check-in the user to the location of the plurality of predetermined locations, wherein
the information is based upon the position information about the vehicle, and check-in includes sharing information related to the location of the plurality of predetermined locations with other users.

23. The position information transmission system according to claim 22, wherein the control unit is configured to output the location of the plurality of predetermined locations along with map information to a display unit.

24. The position information transmission system according to claim 22, wherein the control unit is configured to output information urging the user to check-in to the location of the plurality of predetermined locations.

* * * * *